F. HAECK.
Apparatus for Concentrating and Analyzing Alcoholic Liquors.
No. 45,002. Patented Nov. 8, 1864.
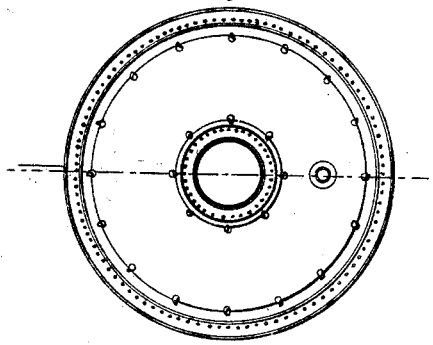
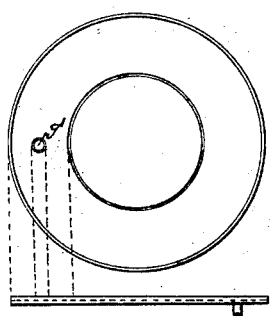
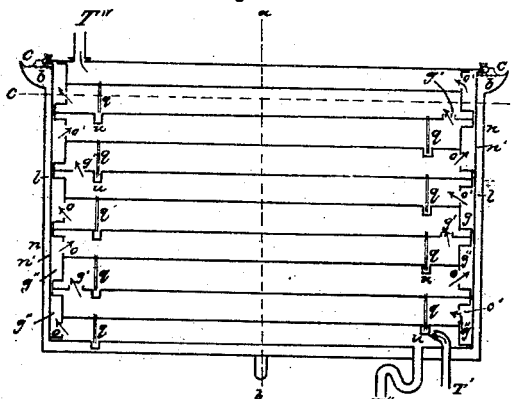
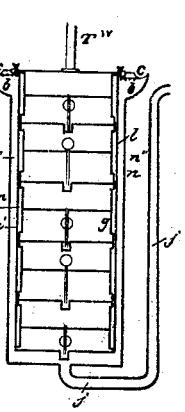
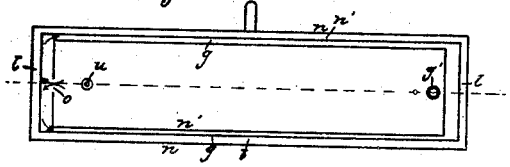

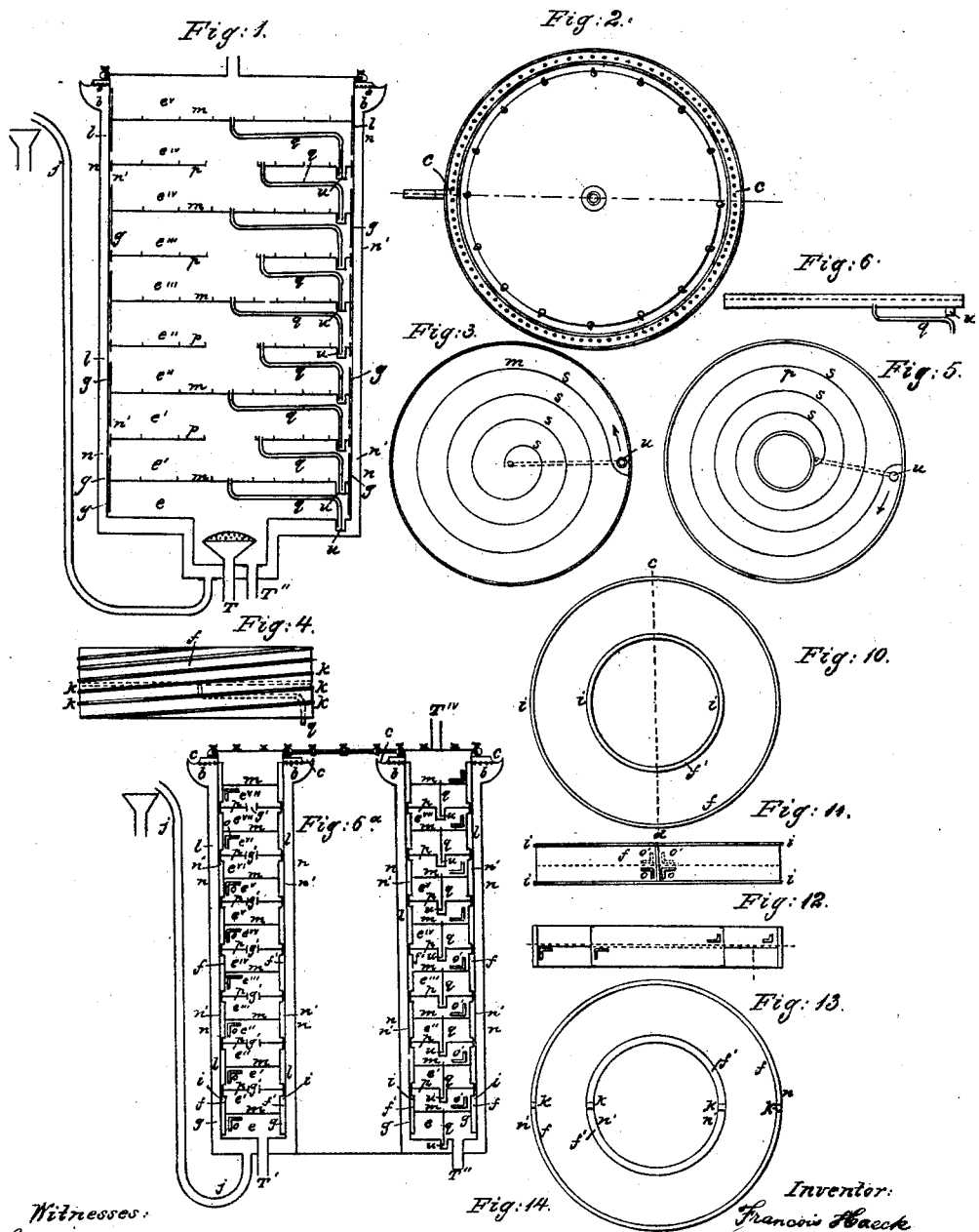

UNITED STATES PATENT OFFICE.

FRANCOIS HAECK, OF BRUSSELS, BELGIUM.

APPARATUS FOR CONCENTRATING AND ANALYZING ALCOHOLIC LIQUIDS.

Specification forming part of Letters Patent No. 45,002, dated November 8, 1864.

*To all whom it may concern:*

Be it known that I, FRANCOIS HAECK, a subject of the King of Belgium, residing at Bussels, Belgium, have invented an Improved Concentrating Analyzing Apparatus for Concentrating the Alcoholic Vapor Issuing from a Still in the Process of Distillation; and I do hereby declare that the following is a full, clear, and exact description of my invention.

Figure 1, Sheet 1, is a vertical section of the concentrating analyzing apparatus constructed in one of the molds devised by me. It is composed of two concentric cylinders, $n$ $n'$, between which water is made to circulate, entering at top in the distributer $c$, which is constructed in the form of a gutter, and the water circulates therein rapidly all round. The gutter $c$ is pierced all round with small holes $o$, through which the water passes into a jacket, $b$. The water descends from the jacket $b$ into the narrow space $l$, and passes out by the pipe $j$. The interior of the cylinder $n'$ is fitted with a series of cylindrical vessels, $m$, superposed and separated by circular plates or annular pans $p$, with apertures in the center; and the upper end of the interior cylinder, $n'$, is closed by a movable circular cover, $n^2$, secured by pressure-screws, the joint being made tight to prevent the leakage of vapor. The vessels $m$ form between themselves chambers $e$ $e'$ $e''$ $e'''$ $e^{iv}$ $e^v$. The alcoholic or other vapor the temperature of which is to be lowered proceeding from the still or other evaporating apparatus enters the chamber $e$ by a pipe, T, terminating in a rose-spreader. To pass from the chamber $e$ to the chamber $e'$ the vapor has no other passage than the narrow space $g$ between the side of the vessel $m$ and the cylinder $n'$. The water $z$ between the two cylinders being of a lower temperature than the vapor which has entered the chamber $e$, it follows that during the passage of the vapor into the space $g$ part of the aqueous vapor becomes condensed, and the remainder which reaches the chamber $e'$ is vapor of a more concentrated degree, or containing a larger proportion of alcohol. The same operation takes place from the chamber $e'$ to the chamber $e''$, and so on for all the chambers until the vapor passes off by the pipe $T^{iv}$ in a concentrated state to the condenser provided for condensing the vapor into a liquid. The number of vessels and the height and breadth of the spaces $g$ will vary according to the work to be performed. The cylindrical body $f$ of each vessel is fitted with projecting helical partitions $k$, as indicated in Fig. 4, which form a helical channel around the vessel and compel the vapor coming from the chamber $e$ to pass around the vessel in the helical channel, and to remain in contact more or less long with the side of the cylinder $n'$ before passing into the chamber $e'$. The same helical channel for the vapor is adapted to all the vessels. The portions of vapor condensed in the spaces $g$ fall on the annular pans $p$ and vessels $m$, where they are partly revaporized. The remainder descend from stage to stage by the overflow-pipes $q$, and finally issue from the apparatus by the return-pipe $T''$ to again enter the evaporating apparatus. The lower end of each pipe $q$ dips into a small cup, $u$, of sufficient depth, and which is filled by the first liquid which falls on the bottom of the vessel or pan which is on the same level as the upper edge of the cup. In order to regulate the circulation of the liquid on the bottoms of the vessels and pans, the bottoms are fitted with spirals $s$, Figs. 3 and 5, which form a continuous spiral channel. Fig. 3 refers to the vessels $m$, and Fig. 5 to the annular pans $p$.

Fig. 2 is a plan of the cover of the cylinder $n'$. This movable cover is fastened upon the cylinder $n'$ by pressure-screws.

Fig. 6 is a side elevation of one of the annular pans $p$.

The whole apparatus, consisting of the cylinders $n$ $n'$, vessels $m$, and annular pans $p$, admits of being separated piece by piece to be cleaned by hand.

Fig. 6ª, Sheet 2, is a vertical section of another analyzing-concentrator of double action, for performing the same work as the preceding one. It is composed of two sets of double concentric cylinders, $n$ $n'$, fitted one in the other, and between the sides of which water at a temperature determined by the nature of the operation to be performed is allowed to circulate. The water enters by gutters $c$ $c$, passes by small lateral openings into the jackets $b$ $b$, descends into narrow spaces $l$ $l$, and makes its exit by a pipe, $j$. The interior of the double concentric cylinder $n'$ is occupied by annular vessels $m$, with two cylindrical sides, $f f'$. The sides $f f'$ are at a slight distance from the sides of the cylinder $n'$. The vessels are superposed, and are separated by annular pans $p$, with openings at $g'$. The vessels form chambers $e\ e'\ e''\ e'''\ e^{iv}$, &c. Vapor from the still or evaporating apparatus enters the chamber $e$ by the pipe $T'$. To pass from $e$ to $e'$ the vapor should flow in the form of thin currents through the narrow spaces $g$, comprised between the sides $f$ and $n'$ and $f'$ and $n'$. The entrance of the vapor into the space $f n'$ takes place by two openings, $o$, Fig. 11, formed in the side $f$, and after having made a semicircular turn the vapor passes out of the narrow space by two openings, $o'$, and enters the chamber $e'$. The same circulation takes place round the side $f'$. In order to compel the vapor to make a complete semicircular turn between the openings $o\ o'$, the upper and lower edges of the sides $f f'$ are arranged in such manner as to prevent the vapor passing directly from the chamber $e$ to the chamber $e'$.

Figs. 6ª and 11 show that this arrangement consists in constructing these sides hollow, and in causing the edges $i'$ to touch the sides of the surrounding cylinder.

In order the better to insure the lower and upper closing of the sides of the vessel $m$, the upper edge of the trough is covered with packing, while the lower edge dips in the liquid which remains on the pan $p$, which supports all the vessel. By means of these arrangements the vapor has no entrance except the openings $o$ and no exit except the openings $o'$. The openings $o$ at the bottom of each side for the exit of vapor from the chamber $e$ are separated by vertical partitions; the same with the openings $o'$ at the top of the side of the same vessel for the issue of the vapor into the chamber $e'$. It is the same for all the vessels.

Fig. 13 is a horizontal section of the sides of the vessel $m$ and of the surrounding cylinders $n'$. $k$ shows the situation of the vertical partitions which separate the openings $o$ on one side and the openings $o'$ on the other. There may, if desired, be only one opening at the bottom and one at the top of each side of the vessel. In this case the vapor should make a complete turn round the side of the vessel to pass from $e$ to $e'$, and one of the partitions is suppressed. (See Fig. 14.) If, instead of the two openings for the entrance and for the exit, three were formed, it would be necessary to have three partitions, and so on. The number of openings to each side, the breadth and height of the narrow space which the vapor traverses to pass from one chamber to another, the number of superposed vessels, the whole height of the apparatus, and other details depend upon the nature of the work to be performed. The condensed vapors fall in a liquid state on the bottoms of the vessels and intermediate pans, where they are partly revaporized. The remaining portions fall by degrees through the overflow-pipes $q$ to the evaporating apparatus, to which they are led by the pipe $T''$. The cup $u$ is filled by the first liquid, which falls on the pan and upon the vessel to which it is fixed. The vapor, after having passed from chamber to chamber, makes its exit by the pipe $T^{iv}$. When the nature of the operation to be performed requires no boiling of the liquids which have fallen on the bottoms of the vessels and pans, it is of no consequence whether the vapor enters the apparatus at bottom or at top, and passes out at the top or bottom, respectively. The bottoms of the vessels and pans may be supplied with substances which have the property of absorbing or retaining the constituents which it is desired to separate.

Fig. 8 is a plan of one of the pans $p$; Fig. 7, a plan of the cover of the double cylinder $n'$; Fig. 9, a side elevation of one of the pans $p$; Fig. 10, a horizontal section through the middle of one of the vessels $m$. Fig. 11 indicates the position of the openings $o$ and $o'$ in the side $f$ of the vessels $m$. Fig. 12 is a vertical section of one of the vessels $m$ through the line $c\ d$ of Fig. 10, showing the positions of the openings $o$ and $o'$ in the sides of the vessel.

The apparatus may be constructed of any size.

Fig. 15, Sheet 3, is a vertical longitudinal section of an analyzing-concentrator with double analyzing-surface, but in the form of a rectangular parallelopipedon. The development of a cylinder being a rectangle, it is obvious that all that has been before stated applies to this rectangular apparatus with double surface, except some modifications hereinafter mentioned of the details relative to the circulation of the vapor.

Fig. 16 is a horizontal section of this apparatus through $c\ d$ of Fig. 15.

Fig. 17 is a cross-section through $a\ b$ of Fig. 15. In this apparatus the openings $o$ and $o'$ are in the side of the vessel, at the extremity of the lower and upper chamber of each vessel. The vapor thus circulates from chamber to chamber by passing in a regular manner by the narrow spaces $g$ in a straight line formed by the sides $l$ of the outer case and the rectangular sides of the vessel; but in order to render the circulation of the vapor easier, the spaces $g''$, Fig. 15, are much enlarged, which allows the lateral spaces $g$, Fig. 16, to be greatly narrowed.

The taking to pieces of all the parts of this apparatus is effected in the manner already described.

If the nature of the work requires it, the vapor may in this apparatus be made to enter at the top and pass out at the bottom.

This apparatus, like all the others, may be constructed of tinned copper of any size.

From the foregoing description it appears that the apparatus called an "analyzing-concentrator," in whatever form it may be made, is composed partly of a receiver completely surrounded by hot water maintained at a constant temperature by the regulated introduction of cold water distributed in the body of hot water by means of a rapid circulation of water entering a narrow gutter pierced all round with small lateral holes, and partly of a series of vessels superposed in the interior of the receiver above mentioned as being surrounded with water at a constant temperature, each of these vessels performing a triple operation, viz: first, the operation of evaporating the alcoholic liquid contained upon their large bottoms; second, the operation of analyzing the vapor while it traverses the narrow space formed by the side of the trough and the side of the receiver; and, third, the operation of precipitating or depositing on the bottoms of the troughs matters mechanically carried along with the vapor and particles of water or alcohol arising from condensed vapors, this precipitation on the bottom being aided by the considerable capacity of the chambers of each vessel, which is on that account traversed by the vapor very slowly compared with the speed with which it traverses before and afterward the same narrow spaces in which it undergoes the analyzing operation. This analyzing-concentrator, as has before been shown, may be of cylindrical form, with a single analyzing side, as shown at Figs. 1 and 6, Sheet 1, or with double analyzing sides, as shown at Figs. 7 to 14, Sheet 2, or of the rectangular form shown at Figs. 15 to 17, Sheet 3; or it may be of a form different from any of these, provided there are at least as many repeated operations of evaporating the alcoholic liquid, analyzing the vapor, and precipitating aqueous or alcoholic particles as there are superposed vessels in the interior of the receiver. For large applications, however, the rectangular form is preferred, not only for the facility of its construction, but also because it permits at the same time the largest boiling-surfaces for the alcoholic liquid, the thinnest and most extended spaces for the analyzing of the vapor, the most capacious chambers for the deposit or precipitation of the particles of vapor or drops of liquid arising from condensation, and, lastly, because it permits of the circulation of the vapor without any pressure from one extremity of the apparatus to the other.

Instead of employing water as the cooling medium for analyzing the vapors, moistened air may be employed, the circulation of which is effected by the regulated drawing power of a steam-jet in a funnel placed on the top of the apparatus, or by a fan, which forces the moistened air through the analyzing-chambers. It will also be seen that the apparatus not only furnishes a very large analyzing-surface by causing the vapor to pass in narrow currents around the internal vessels as it passes from one chamber to another, but also permits the thorough and easy cleansing of every part of the surface with which the vapors or the products of their partial condensation come in contact, for the cover of the apparatus may be removed by removing the pressure-screws, and the vessels and pans within it may be lifted out separately, so that every part of the interior surface of the apparatus is exposed.

What I claim in this patent as my invention is—

1. The concentrating analyzing apparatus herein described, consisting, substantially, of a series of chambers, analyzing-channels, and return-pipes arranged within a vessel having double sides, between which the cooling-fluid is contained, substantially as set forth.

2. The construction of the vessels and pans and partitions forming analyzing-channels, as herein set forth, in such manner that they may be withdrawn from the vessel that contains them for the purpose of being cleansed.

In witness whereof I have hereunto set my hand.

FRANCOIS HAECK.

Witnesses:
T. VIRNEBURG,
G. DAWES.